US011783207B2

(12) United States Patent
Emanuel et al.

(10) Patent No.: US 11,783,207 B2
(45) Date of Patent: Oct. 10, 2023

(54) ROBOTIC TOXICODENDRON WEEDING

(71) Applicant: INTERNATIONAL BUSINESS MACHINES CORPORATION, Armonk, NY (US)

(72) Inventors: Barton Wayne Emanuel, Manassas, VA (US); Nadiya Kochura, Bolton, MA (US); Tiberiu Suto, Franklin, NY (US); Vinod A. Valecha, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 16/793,792

(22) Filed: Feb. 18, 2020

(65) Prior Publication Data

US 2021/0256398 A1    Aug. 19, 2021

(51) Int. Cl.
*G06N 5/04*    (2023.01)
*B25J 9/16*    (2006.01)
(Continued)

(52) U.S. Cl.
CPC ............... *G06N 5/04* (2013.01); *A01M 21/02* (2013.01); *B25J 9/163* (2013.01); *G05B 13/0265* (2013.01); *G06N 20/00* (2019.01)

(58) Field of Classification Search
CPC ..... A01M 21/02; B25J 9/163; G05B 13/0265; G06N 5/04; G06N 20/00; G05D 1/0088;
(Continued)

(56) References Cited

U.S. PATENT DOCUMENTS 4,472,507 A * 9/1984 Pluim, Jr. ............ G01N 33/523
                                                        600/556
5,204,814 A    4/1993 Noonan et al.
(Continued)

FOREIGN PATENT DOCUMENTS

CA    2928581 A1    5/2015
CN    108381560 A    8/2018
(Continued)

OTHER PUBLICATIONS

"The Trouble with Poison Ivy," www.seeleaf.com/wp/about-poison-ivy/, Nov. 11, 2019, 2 pages.
(Continued)

*Primary Examiner* — Michael J Huntley
*Assistant Examiner* — Peter D Coughlan
(74) *Attorney, Agent, or Firm* — Conley Rose, P.C.

(57) ABSTRACT

A system includes a memory having instructions therein and at least one processor in communication with the memory. The at least one processor is configured to execute the instructions to acquire phytomorphological field data via a sensor component of a mobile robot, generate, based on the phytomorphological field data and via a machine learning agent, a predicted likelihood of whether a hypothetical action by the mobile robot against a found plant would be directed against a true *Toxicodendron* plant, conduct a non-phytomorphological assessment of the found plant via the mobile robot and based on the predicted likelihood being below a first threshold and above a second threshold, and, via the mobile robot and based on the non-phytomorphological assessment, attack the found plant, mark a site of the found plant, and/or document a context of the site.

20 Claims, 7 Drawing Sheets

(51) Int. Cl.
    *G05B 13/02*     (2006.01)
    *G06N 20/00*     (2019.01)
    *A01M 21/02*     (2006.01)

(58) Field of Classification Search
    CPC ............... G05D 1/0246; A01B 79/005; G01N 33/0098; G16B 20/10; G06Q 40/08
    See application file for complete search history.

(56) References Cited

U.S. PATENT DOCUMENTS

| | | | |
|---|---|---|---|
| 7,254,464 | B1 | 8/2007 | McLurkin et al. |
| 8,165,409 | B2 | 4/2012 | Ritzau et al. |
| 8,975,014 | B2 | 3/2015 | Braslau |
| 2012/0130201 | A1* | 5/2012 | Jain .................... A61B 5/08 600/301 |
| 2012/0233033 | A1* | 9/2012 | Calman .............. G06Q 20/3278 348/143 |
| 2014/0242712 | A1* | 8/2014 | Braslau ................. A61K 31/69 436/131 |
| 2017/0238460 | A1* | 8/2017 | MacKean ............. A01D 34/008 |
| 2021/0092891 | A1* | 4/2021 | Grant ..................... G06T 7/70 |

FOREIGN PATENT DOCUMENTS

| | | |
|---|---|---|
| CN | 208480530 U | 2/2019 |
| CN | 109676624 A | 4/2019 |
| CN | 109711272 A | 5/2019 |
| CN | 110232345 A | 9/2019 |
| JP | 449203682 B2 | 6/2010 |

OTHER PUBLICATIONS

Cheng, et al., "A Feature-based Machine Learning Agent for Automatic Rice and Weed Discrimination," ResearchGate, Jun. 2015, 7 pages.

"Arduino Robot Arm and Mecanum Wheels Platform Automatic Operation," How to Mechatronics, https://howtomechatronics.com/projects/arduino-robot-arm-and-mecanum-wheels-platform-automatic-operation/, Jan. 7, 2020, 32 pages.

Beaulieu, "Identifying Poison Ivy With Detection Patches Toxic Urushiol Oil Is Found in Poison," https://www.thespruce.com/identification-of-poison-ivy-through-sensing-patches-2132617, 11 pages, updated Jun. 9, 2019.

Radha, "Leaf Disease Detection using Image Processing," Article in Journal of Chemical and Pharmaceutical Sciences Mar. 2017, ResearchGate, https://www.researchgate.net/publication/318109025, 4 pages.

"SeeLeaf™ Product and Instructions," www.seeleaf.com/wp/product/, Nov. 11, 2019, 3 pages.

"Poison Ivy Poison Oak Poison Sumac Information about poison ivy, oak, sumac and the skin rashes they cause", SeeLeaf Detection Wipes | The Poison Ivy, Poison Oak, Poison Sumac Site, https://www.poison-ivy.org/seeleaf-detection-wipes, Nov. 11, 2019, 4 pages.

Palca, "Spray Lights Up The Chemical That Causes Poison Ivy Rash" Spray Lights Up The Chemical That Causes Poison Ivy Rash : Shots—Health News: NPR, https://www.npr.org/sections/health-shots/2012/10/15/162789103/spray-lights-up-the-chemical-that-causes-poison-ivy-rash, Oct. 15, 2012, 15 pages.

\* cited by examiner

ROBOTIC TOXICODENDRON WEEDING

BACKGROUND

The present disclosure relates generally to the field of weed control and, more particularly, to management of unwanted *Toxicodendron* plants.

The genus *Toxicodendron* includes plants such as poison ivy, poison oak, and poison sumac, which are common in parts of North America. These plants may be found growing in residential areas along perimeters (fences, lawn edges, wooded area boundaries, etc.). They are also prevalent along hiking trails and other natural areas frequented by humans. *Toxicodendron* plants produce an oily, allergenic resin called urushiol. When urushiol comes into contact with human skin, it typically causes the subject to experience an itchy and/or painful rash. People with acute urushiol allergies can experience even more significant and severe reactions. Historically, it has been undesirably difficult to visually distinguish poison ivy, poison oak, and poison sumac from other plants species that do not produce urushiol.

Meanwhile, various abilities of machines to acquire and apply knowledge and skills have been categorized as artificial intelligence ("AI"). Machine learning has been considered to be a form of AI. Machine learning has employed algorithms and statistical models that have enabled computer systems use to perform tasks based primarily on data patterns and associated inferences rather than explicit instructions. Some areas of AI have dealt with "autonomous planning or deliberation for robotic systems to navigate through an environment." https://en.wikipedia.org/wiki/Computer_vision. In some instances, "[i]nformation about the environment could be provided by a computer vision system, acting as a vision sensor and providing high-level information about the environment and the robot." Id. Accordingly, AI and computer vision may be thought of as sharing "topics such as pattern recognition and learning techniques." Id. "Consequently, computer vision is sometimes seen as a part of the [AI] field or the computer science field in general." Id.

SUMMARY

A method is disclosed. The method includes acquiring phytomorphological field data using a sensor component of a mobile robot. The method also includes generating, based on the phytomorphological field data and using a machine learning agent, a predicted likelihood of whether a hypothetical action by the mobile robot against a found plant would be directed against a true *Toxicodendron* plant. The method also includes conducting a non-phytomorphological assessment of the found plant using the mobile robot and based on the predicted likelihood being below a first threshold and above a second threshold. The method also includes taking at least one actual action selected from the group consisting of attacking the found plant, marking a site of the found plant, and documenting a context of the site. The action is taken using the mobile robot and based on the non-phytomorphological assessment.

A system is also disclosed. The system includes a memory having instructions therein and at least one processor in communication with the memory. The at least one processor is configured to execute the instructions to acquire phytomorphological field data via a sensor component of a mobile robot. The at least one processor is also configured to execute the instructions to generate, based on the phytomorphological field data and via a machine learning agent, a predicted likelihood of whether a hypothetical action by the mobile robot against a found plant would be directed against a true *Toxicodendron* plant. The at least one processor is also configured to execute the instructions to conduct a non-phytomorphological assessment of the found plant via the mobile robot and based on the predicted likelihood being below a first threshold and above a second threshold. The at least one processor is also configured to execute the instructions to take at least one actual action selected from the group consisting of an attack on the found plant, a marking of a site of the found plant, and a documenting of a context of the site. The action is taken via the mobile robot and based on the non-phytomorphological assessment.

A computer program product is also disclosed. The computer program product includes a computer readable storage medium having program instructions embodied therewith. The program instructions are executable by at least one processor to cause the at least one processor to acquire phytomorphological field data via a sensor component of a mobile robot. The program instructions are also executable by the at least one processor to cause the at least one processor to generate, via a machine learning agent and based on the phytomorphological field data, a predicted likelihood of whether a hypothetical action by the mobile robot against a found plant would be directed against a true *Toxicodendron* plant. The program instructions are also executable by the at least one processor to cause the at least one processor to use the mobile robot to conduct a non-phytomorphological assessment of the found plant based on the predicted likelihood being below a first threshold and above a second threshold. The program instructions are also executable by the at least one processor to cause the at least one processor to take at least one actual action selected from the group consisting of an attack on the found plant, a marking of a site of the found plant, and a documenting of a context of the site. The action is taken based on the non-phytomorphological assessment and via the mobile robot.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
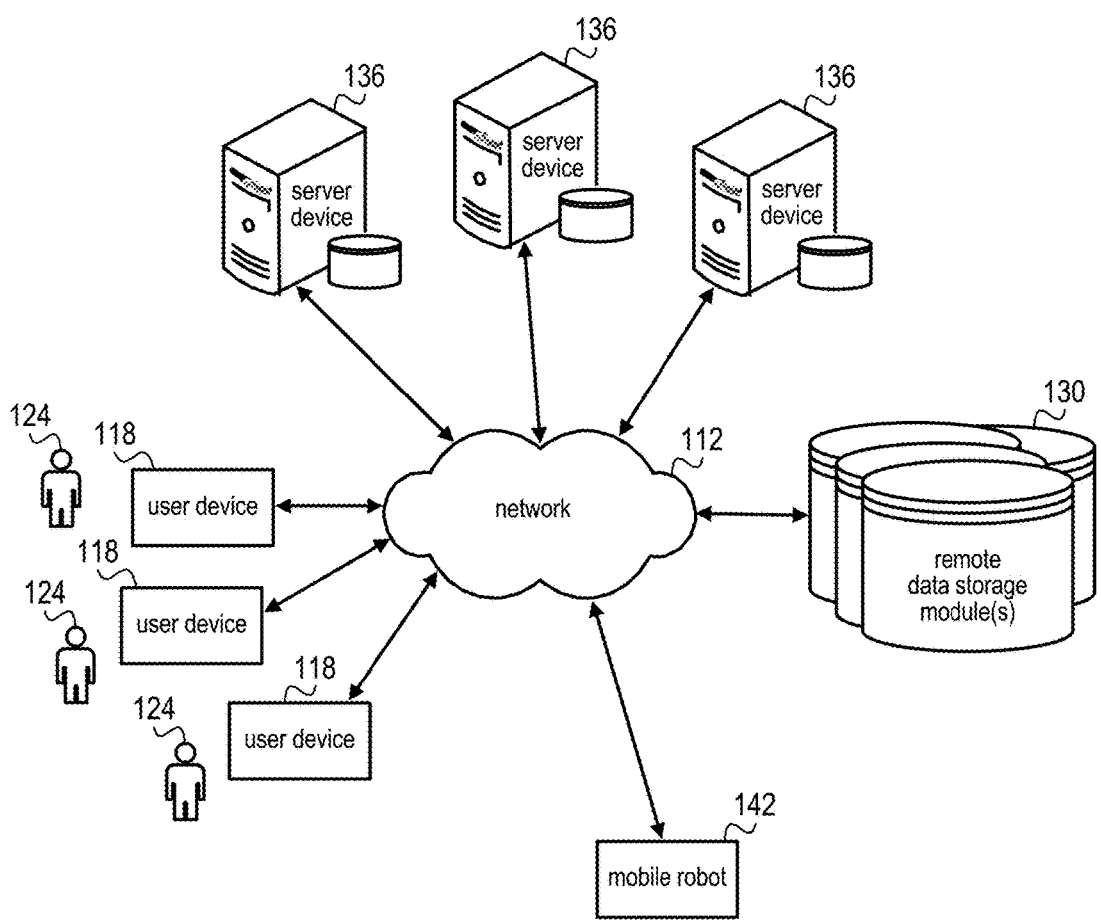
FIG. 1 is a block diagram illustration of a network environment in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Aspects of the present disclosure provide a mobile robot which is capable of determining and marking locations of *Toxicodendron* plants. In some embodiments, a computer vision system captures video and still photos and feeds them to a server-based machine learning agent that has been trained to identify poison ivy, poison oak, and/or poison sumac. Some embodiments spray or pull the unwanted plants. Some embodiments plant or drop a marker in the vicinity of a detected plant.

As used within the written disclosure and in the claims, the terms "including" and "comprising" (and inflections thereof) are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A "module" or "unit" (and inflections thereof) as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" (and inflections thereof) means to receive and/or transmit data or information over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device.

"Plant morphology or phytomorphology is the study of the physical form and external structure of plants. This is usually considered distinct from plant anatomy, which is the study of the internal structure of plants, especially at the microscopic level. Plant morphology is useful in the visual identification of plants." https://en.wikipedia.org/wiki/Plant morphology (citations omitted). As used herein, the term "phytomorphological" (and inflections thereof) means related to the physical form and external structure of one or more plants, "training data" (and inflections thereof) means data suitable for training a machine learning agent, and "field data" (and inflections thereof) means data acquired using one or more cameras or one or more other sensor components of a mobile robot.

FIG. 1 is a block diagram illustration of a network environment 100 in accordance with aspects of the present disclosure. The network environment 100 includes a network 112, one or more user devices 118, one or more users 124, one or more remote data storage modules 130, one or more server devices 136, and a mobile robot 142.

The network 112 comprises any type of network that enables the one or more user devices 118, the one or more remote data storage modules 130, the one or more server devices 136, and the mobile robot 142 to communicate with each other through (i.e., "over") the network 112. For example, the network 112 may comprise one or more wired and/or wireless networks such as, but not limited to, one or more radio networks (e.g., cellular network or mobile network), one or more local area networks ("LANs"), one or more wide area networks ("WANs"), one or more metropolitan area networks ("MANs"), etc. The network 112 may also comprise one or more private networks and/or one or more public networks (such as, but not limited to, the Internet). In some embodiments, the network 112 may comprise a corresponding one or more of a data processing system like the data processing system 600 (the data processing system 600 per se is not explicitly illustrated in FIG. 1, but see FIG. 6). In some embodiments, the network 112 may comprise one or more suitable computers, machines, modules, and/or devices provided by an Internet service provider.

Each of the one or more user devices 118 is communicatively coupled to the network 112 and is communicatively coupled (through or over the network 112) to each other, to the one or more remote data storage modules 130, to the one or more server devices 136, and to the mobile robot 142. Each of the one or more user devices 118 comprises any type of device that allows the one or more users 124 to audibly, textually, or otherwise suitably interact with the other user devices 118, the one or more remote data storage modules 130, the one or more server devices 136, and the mobile robot 142 through or over the network 112. Non-limiting examples of one of the one or more user devices 118 include a personal computer (desktop or laptop), a mobile device (e.g., personal digital assistant ("PDA"), smart phone, tablet, etc.), and a cognitive voice assistant device (e.g., Amazon's Alexa®, a Google Home® device, etc.). In some embodiments, the one or more user devices 118 may comprise a corresponding one or more of a data processing system like the data processing system 600 (the data processing system 600 per se is not explicitly illustrated in FIG. 1, but see FIG. 6).

Each of the one or more remote data storage modules 130 is communicatively coupled to the network 112 and is communicatively coupled (through or over the network 112) to each other, to the one or more user devices 118, to the one or more server devices 136, and to the mobile robot 142. The one or more remote data storage modules 130 are configured to (alone or in combination) store and provide access to various data that may be generated, modified, and/or used in accordance with aspects of the present disclosure. In some embodiments, the one or more remote data storage modules 130 may comprise a corresponding one or more of a data processing system like the data processing system 600 (the data processing system 600 per se is not explicitly illustrated in FIG. 1, but see FIG. 6). In some embodiments, the one or more remote data storage modules 130 may comprise one or more suitable computers, machines, modules, and/or devices provided by an Internet service provider.

Each of the one or more server devices 136 is communicatively coupled to the network 112 and is communicatively coupled (through or over the network 112) to each other, to the one or more user devices 118, to the one or more remote data storage modules 130, and to the mobile robot 142. The one or more server devices 136 comprise a machine learning agent and any one or more devices that can (alone or in combination with one or more other components of the network environment 100) suitably implement a *Toxicodendron* weeding method 500 in accordance with aspects of the present disclosure (the method 500 per se is not explicitly illustrated in FIG. 1, but see FIG. 5A-5B). In some embodiments, the one or more server devices 136 may comprise a corresponding one or more of a data processing system like the data processing system 600 (the data processing system 600 per se is not explicitly illustrated in FIG. 1, but see FIG. 6). In some embodiments, the one or more server devices 136 may comprise one or more suitable computers, machines, modules, and/or devices provided by an Internet service provider.

The mobile robot 142 is wirelessly communicatively coupled to the network 112 and is communicatively coupled (through or over the network 112) to the one or more user devices 118, to the one or more remote data storage modules 130, and to the one or more server devices 136. The mobile robot 142 is configured to move from place to place, to acquire data, and to physically influence its surroundings in accordance with aspects of the present disclosure. In some embodiments, the mobile robot 142 may comprise a robot arm and wheels platform like the Arduino Robot Arm and Mecanum Wheels Platform that is shown and described by How To Mechatronics at https://howtomechatronics.com/projects/arduino-robot-arm-and-mecanum-wheels-platform-automatic-operation/and at https://www.youtube.com/watch?v=LBNRGBY5zN8.

Figure 2:
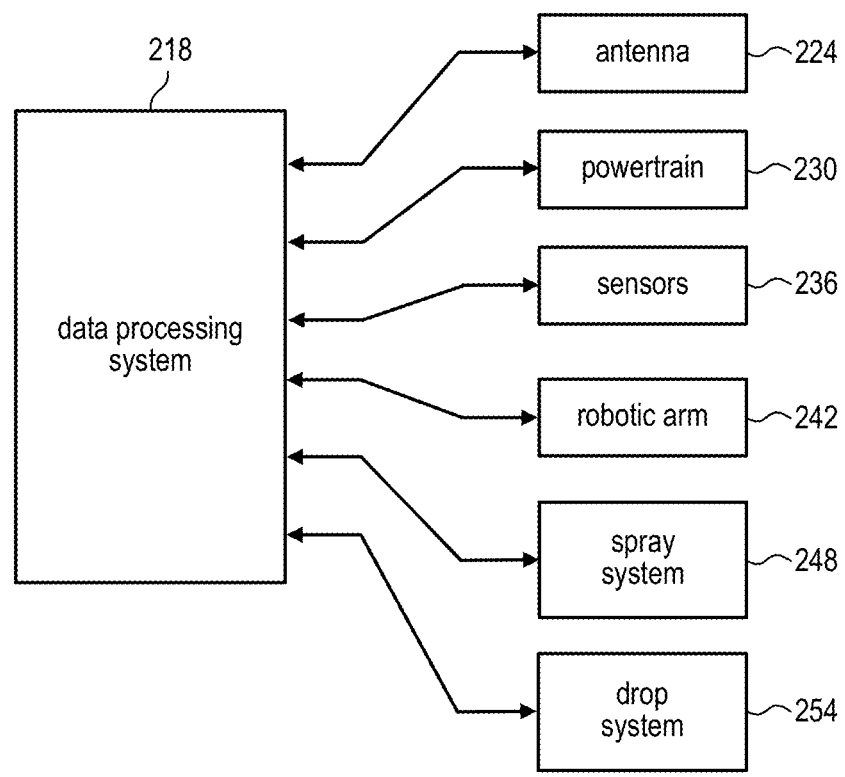
FIG. 2 is a block diagram illustration of a mobile robot in accordance with aspects of the present disclosure.

FIG. 2 is a block diagram illustration of the mobile robot 142. The mobile robot 142 may be configured to be landborne, airborne, or waterborne, and comprises a data processing system 218. The data processing system 218 is configured to process data and to control and coordinate various components, features, and systems of the mobile robot 142 in accordance with aspects of the present disclosure. In some embodiments, the data processing system 218 may comprise a corresponding one or more of a data processing system like the data processing system 600 (the data processing system 600 per se is not explicitly illustrated in FIG. 2, but see FIG. 6).

The mobile robot 142 also comprises an antenna 224. The antenna 224 is communicatively coupled to the data processing system 218. It should be appreciated that the antenna 224 (and, through the antenna 224, the data processing system 218 as well) may also be wireless communicatively coupled to the network 112 and thus, also communicatively coupled (through or over the network 112) to the one or more user devices 118, to the one or more remote data storage modules 130, and to the one or more server devices 136 (the network 112, the user devices 118, the remote data storage modules 130, and the server devices 136 per se are not explicitly shown in FIG. 2, but see FIG. 1). The antenna 224 is configured to convert outgoing radio frequency transmission signals from the data processing system 218 into corresponding radio frequency transmission energy and to convert incoming radio frequency transmission energy into corresponding radio frequency transmission signals to the data processing system 218. In some embodiments, the data processing system 218 may be configured to receive and transmit Wi-Fi (i.e., IEEE 802 protocol family) communications and, accordingly, the antenna 224 may be suitable for receiving and transmitting one or more Wi-Fi radio frequencies. In some embodiments, the data processing system 218 and the antenna 224 may be configured for cellular telecommunications or any other suitable wireless communications.

The mobile robot 142 also comprises a powertrain 230. The powertrain 230 is communicatively coupled to the data processing system 218. The powertrain 230 is configured to (under control of the data processing system 218) generate power for moving the mobile robot 142 from place to place and to deliver that power a suitable motive or tractive surface or medium. The powertrain 230 may comprise one or more motors and wheels and/or tracks (for land mobility), one or motors and propellers and/or jets (for air and/or water mobility), and/or any other suitable components for moving the mobile robot 142 from place to place in accordance with aspects of the present disclosure.

The mobile robot 142 also comprises one or more sensors 236. The one or more sensors 236 are communicatively coupled to the data processing system 218. The one or more sensors 236 are configured to (under control of the data processing system 218) record images in the form of photographs, film, and/or video signals, and/or to translate images into signals, and to transmit corresponding data to the data processing system 218. The one or more sensors 236 may comprise one or more infrared cameras, one or more visual light cameras, one or more ultraviolet cameras, one or more ultrasonic devices, one or more sonic devices, one or more radar devices, one or more pan-tilt-zoom features, one or more virtual pan-tilt-zoom features, one or more periscopic features, and/or any other one or more suitable analog and/or digital sensors, one or more suitable analog and/or digital components, and/or one or more suitable analog and/or digital features for imaging one or more properties of one or more plants in accordance with aspects of the present disclosure.

The mobile robot 142 also comprises a robotic arm 242. The robotic arm 242 is communicatively coupled to the data processing system 218. The robotic arm 242 is configured to (under control of the data processing system 218) grasp, plant, and/or pull things and cooperate with a spray system 248 (described further below) in accordance with aspects of the present disclosure.

The mobile robot 142 also comprises the spray system 248. The spray system 248 is communicatively coupled to the data processing system 218 and is mechanically coupled to the robotic arm 242. The spray system 248 is configured to (under control of the data processing system 218) cooperate with the robotic arm 242 to spray things with one or more urushiol detectors, one or more herbicides, one or more paints, and/or one or more other substances in accordance with aspects of the present disclosure.

The mobile robot 142 also comprises a drop system 254. The drop system 254 is communicatively coupled to the data processing system 218. The drop system 254 is configured to (under control of the data processing system 218) drop numbered balls and/or other site markers in accordance with aspects of the present disclosure.

Figure 3:
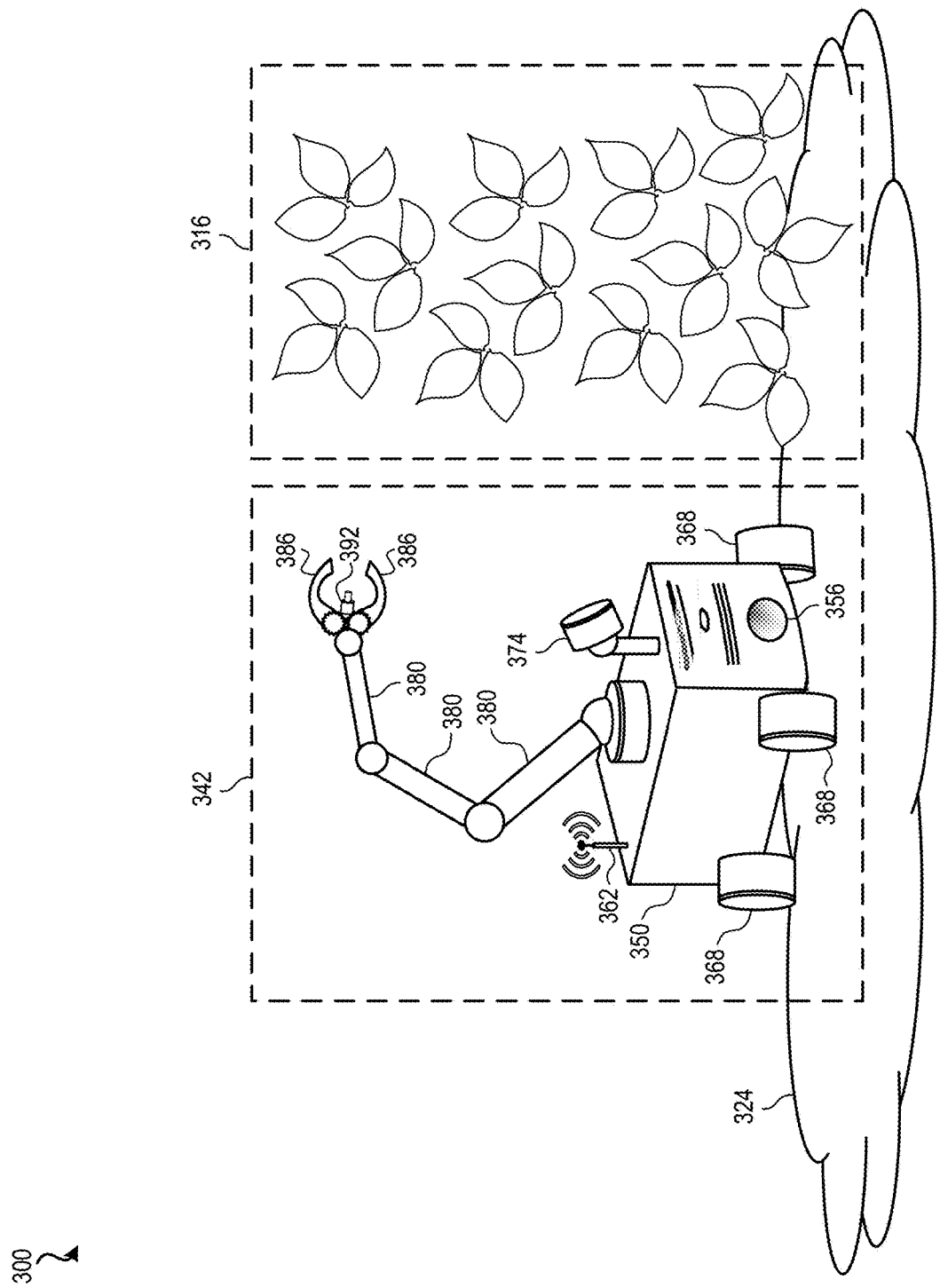
FIG. 3 is a perspective illustration of a land-borne mobile robot field environment in accordance with aspects of the present disclosure.

FIG. 3 is a perspective illustration of a land-borne mobile robot field environment 300. It should be appreciated that the land-borne mobile robot field environment 300 is but one example of various possible land-borne mobile robot field environments in accordance with aspects of the present disclosure. That said, the land-borne mobile robot field environment 300 comprises a first growth 316 of one or more found plants, a drivable terrain or other drivable surface 324, and a land-borne mobile robot 342. The land-borne mobile robot 342 is but one of various possible land-borne embodiments of the mobile robot 142, and comprises a land-borne body 350 having a drop system port 356, a land-borne Wi-Fi antenna 362 mechanically coupled to and extending from the land-borne body 350, drive wheels 368 mechanically coupled to the land-borne body 350, a land-borne pan-tilt-zoom camera 374 mechanically coupled to and extending from the land-borne body 350, land-borne robotic arm extremities 380 mechanically coupled to and extending from the land-borne body 350, land-borne robotic arm pincers 386 mechanically coupled to and extending from the land-borne robotic arm extremities 380, and a land-borne spray nozzle 392 mechanically coupled to and extending from the land-borne robotic arm extremities 380.

Figure 4:
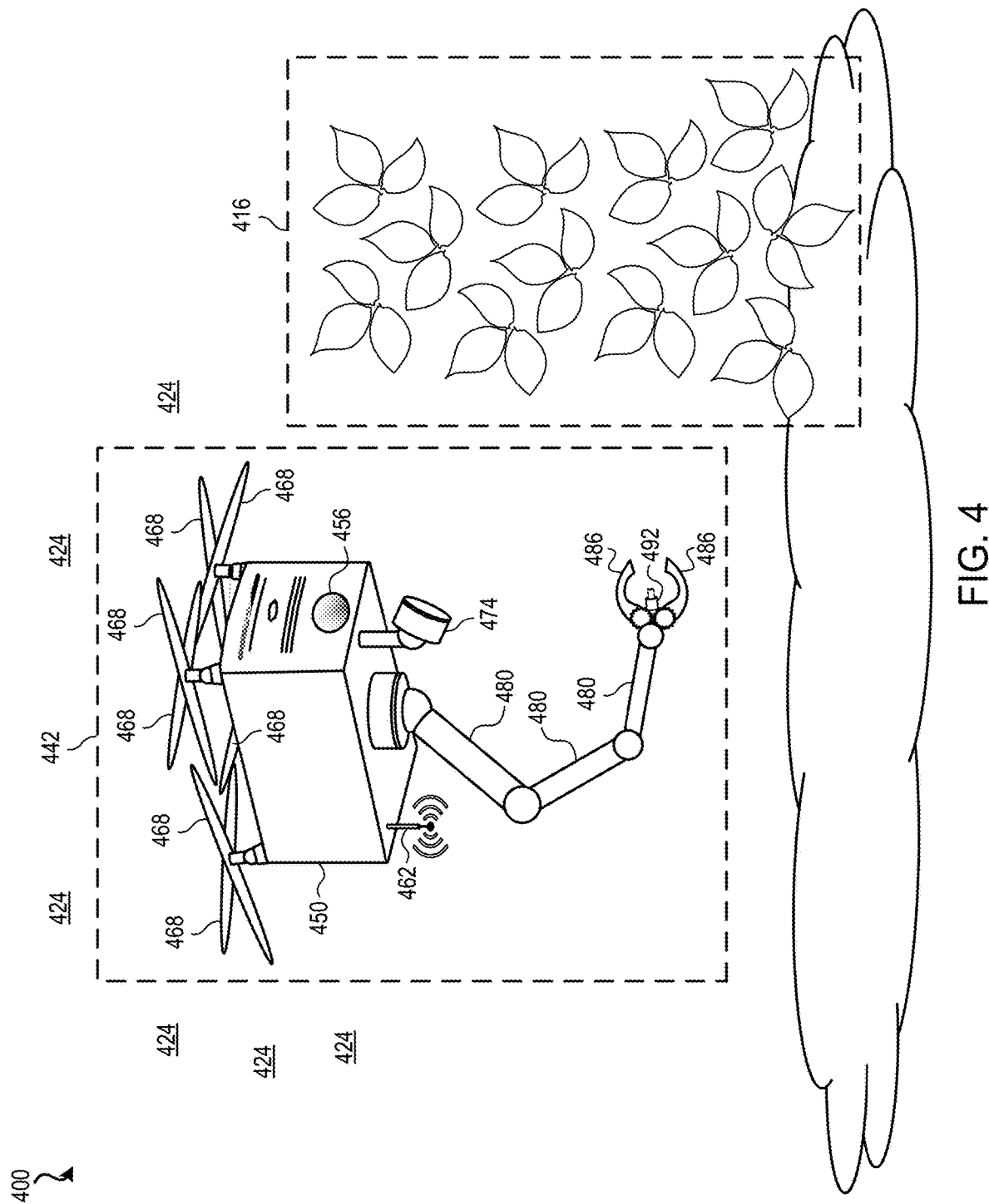
FIG. 4 is a perspective illustration of an airborne mobile robot field environment in accordance with aspects of the present disclosure.

FIG. 4 is a perspective illustration of an airborne mobile robot field environment 400. It should be appreciated that the airborne mobile robot field environment 400 is but one example of various possible airborne mobile robot field environments in accordance with aspects of the present disclosure. That said, the airborne mobile robot field environment 400 comprises a second growth 416 of one or more found plants, a legally flyable airspace 424, and an airborne mobile robot 442. The airborne mobile robot 442 is but one of various possible airborne embodiments of the mobile robot 142, and comprises an airborne body 450 having a drop system port 456, an airborne Wi-Fi antenna 462 mechanically coupled to and extending from the airborne body 450, rotary wings 468 mechanically coupled to the airborne body 450, an airborne pan-tilt-zoom camera 474 mechanically coupled to and extending from the airborne body 450, airborne robotic arm extremities 480 mechanically coupled to and extending from the airborne body 450, airborne robotic arm pincers 486 mechanically coupled to and extending from the airborne robotic arm extremities 480, and an airborne spray nozzle 492 mechanically coupled to and extending from the airborne robotic arm extremities 480.

Figure 5A:
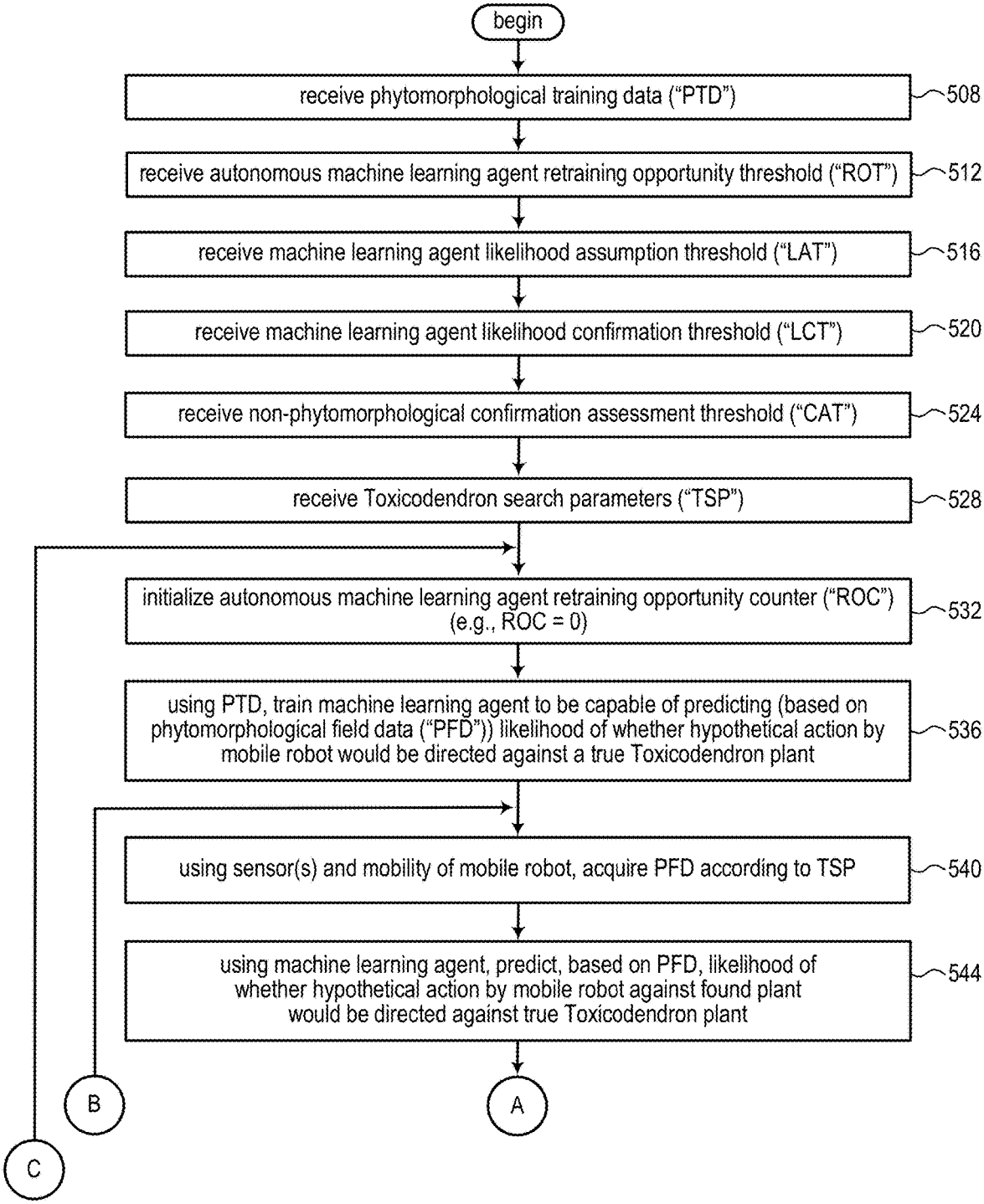
FIG. 5A-5B are a flowchart illustration of a *Toxicodendron* weeding process in accordance with aspects of the present disclosure.
Figure 5B:
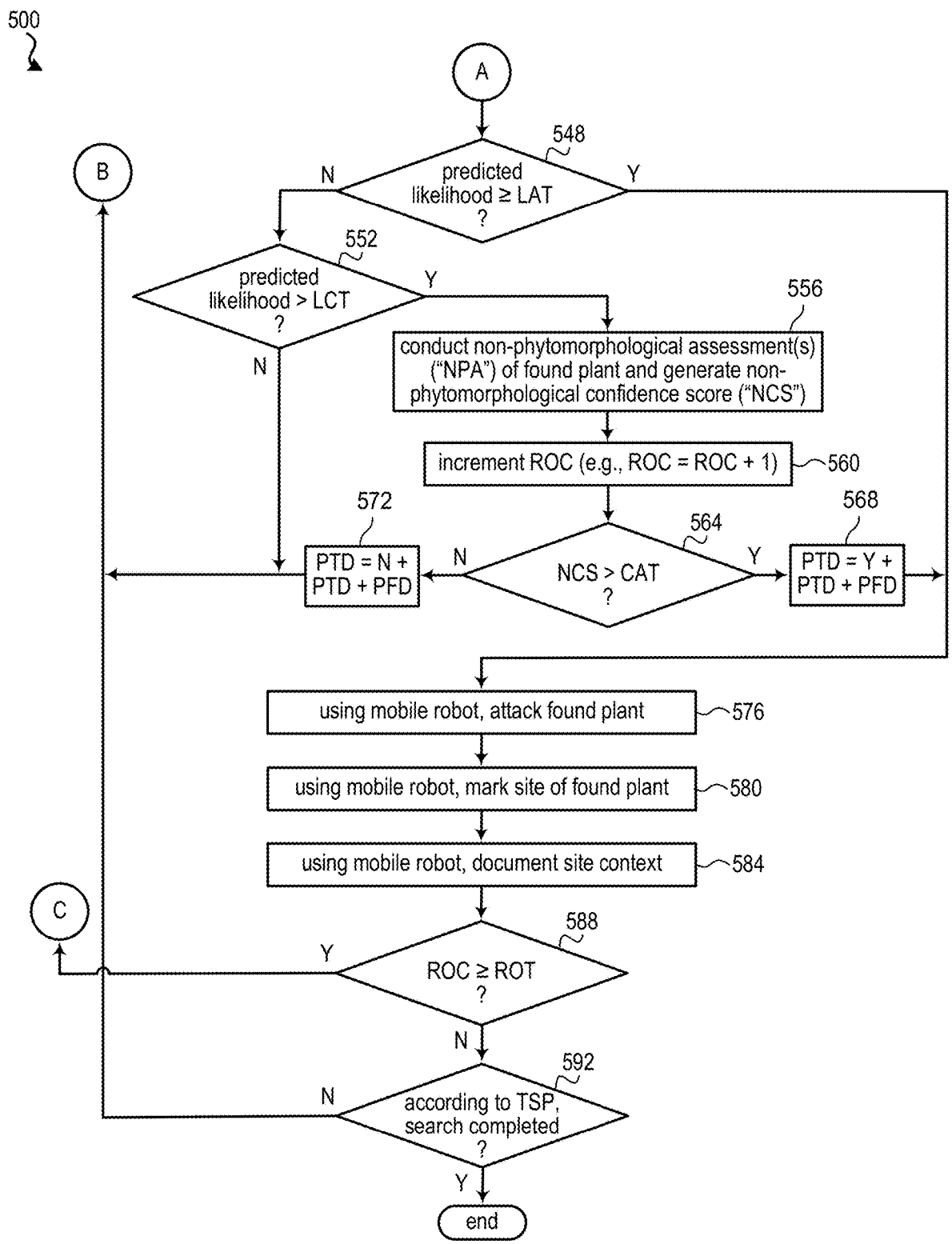

FIG. 5A-5B are a flowchart illustration of a *Toxicodendron* weeding process 500 in accordance with aspects of the present disclosure. In some instances, one or more steps of the process 500 may be performed by the one or more server devices 136 and/or one or more of the other systems, components, methods, and/or processes described herein. For clarity of exposition, the following description(s) of the process 500 may refer to one or more of such systems, components, methods, and/or processes. Nevertheless, it should be appreciated that the process 500 and/or any one or more of its particular steps may be performed by any suitable system(s), component(s), method(s), and/or process(es). It should also be appreciated that the process 500 may be performed concurrently or substantially concurrently with any other method(s) and/or process(es) described herein.

At step 508, the process 500 receives phytomorphological training data ("PTD"). The PTD comprises phytomorphological data in a form suitable for training a machine learning agent. The PTD may be supplied by one or more system developers, one or more cloud service providers, one or more previous operations of the process 500, and/or any one or more other suitable sources. In some instances, one of the one or more users 124 may use a corresponding one of the one or more user devices 118 to cause the one or more server devices 136 to retrieve (and, thus, receive) predetermined PTD from the one or more remote data storage modules 130 (through or over the network 112). From step 508, the process 500 goes to (and continues at) step 512.

At step 512, the process 500 receives an autonomous machine learning agent retraining opportunity threshold ("ROT"). The ROT is a value for a numeric parameter that may be used (as described further below) in determining if/when to automatically retrain the machine learning agent. In some instances, one of the one or more users 124 may use a corresponding one of the one or more user devices 118 to communicate (through or over the network 112) a desired ROT to the one or more server devices 136 (and, thus, cause the one or more server devices 136 to receive the ROT). From step 512, the process 500 goes to (and continues at) step 516.

At step 516, the process 500 receives a machine learning agent likelihood assumption threshold ("LAT"). The LAT is a value for a numeric parameter that may be used (as described further below) in determining if/when to conduct one or more non-phytomorphological assessments. In some instances, one of the one or more users 124 may use a corresponding one of the one or more user devices 118 to communicate (through or over the network 112) a desired LAT to the one or more server devices 136 (and, thus, cause the one or more server devices 136 to receive the LAT). From step 516, the process 500 goes to (and continues at) step 520.

At step 520, the process 500 receives a machine learning agent likelihood confirmation threshold ("LCT"). The LCT is a value for a numeric parameter that may be used (as described further below) in determining if/when to conduct one or more non-phytomorphological assessments. In some instances, one of the one or more users 124 may use a corresponding one of the one or more user devices 118 to communicate (through or over the network 112) a desired LCT to the one or more server devices 136 (and, thus, cause the one or more server devices 136 to receive the LCT). From step 520, the process 500 goes to (and continues at) step 524.

At step 524, the process 500 receives a non-phytomorphological confirmation assessment threshold ("CAT"). The CAT is a value for a numeric parameter that may be used (as described further below) in evaluating one or more results of the one or more non-phytomorphological assessments. In some instances, one of the one or more users 124 may use a corresponding one of the one or more user devices 118 to communicate (through or over the network 112) a desired CAT to the one or more server devices 136 (and, thus, cause the one or more server devices 136 to receive the CAT). From step 524, the process 500 goes to (and continues at) step 528.

At step 528, the process 500 receives *Toxicodendron* search parameters ("TSP"). The TSP may be used (as described further below) in acquiring phytomorphological field data. Accordingly, the TSP may comprise data representing one or more property lines; one or more fence lines; one or more tree lines; one or more geographic features; one or more land, air, and/or water boundaries and/or areas; one or more map coordinates; one or more compass coordinates; one or more Global Positioning System ("GPS") coordinates; and/or other data describing, defining, and/or specifying one or more areas and/or locations to be traversed by a mobile robot in search of *Toxicodendron* plants. The TSP may also comprise a specification or other selection of a circular search pattern, a crisscross search pattern, a random search pattern, a straight-line search pattern, and/or any other suitable search pattern to be followed by the mobile robot during the search. In some instances, one of the one or more users 124 may use a corresponding one of the one or more user devices 118 to communicate (through or over the network 112) desired TSP to the one or more server devices 136 (and, thus, cause the one or more server devices 136 to receive the TSP). From step 528, the process 500 goes to (and continues at) step 532.

At step 532, the process 500 automatically initializes an autonomous machine learning agent retraining opportunity counter ("ROC"). The ROC is a counter that may be used (as described further below) in determining if/when to automatically retrain the machine learning agent. In some instances, step 532 may comprise automatically causing the one or more server devices 136 to set the ROC equal to zero. In some instances, step 532 may comprise automatically causing the one or more server devices 136 to set the ROC to another suitable initial value. From step 532, the process 500 goes to (and continues at) step 536.

At step 536, the process 500 automatically uses the current PTD to train (or retrain, as the case may be) the machine learning agent to be capable of suitably predicting (based on phytomorphological field data ("PFD")) a likelihood of whether a hypothetical action by the mobile robot would be directed against a true *Toxicodendron* plant. The PTD may comprise data representing one or more colors, one or more shapes, one or more branch patterns, and/or one or more cluster and/or grouping arrangements of one or more leaves, one or more flowers, one or more stalks, and/or one or more other distinguishing phytomorphological characteristics and/or features of one or more *Toxicodendron* and non-*Toxicodendron* plants. In some instances, step 536 may comprise automatically causing the one or more server devices 136 to train (or retrain, as the case may be) the machine learning agent. From step 536, the process 500 goes to (and continues at) step 540.

At step 540, the process 500 automatically uses one or more sensors of the mobile robot and the mobility of the mobile robot to acquire PFD in search of (according to the TSP) *Toxicodendron* plants. In some instances, step 540 may comprise automatically causing the land-borne mobile robot 342 to use its land-borne pan-tilt-zoom camera 374 to acquire the PFD. In some instances, step 540 may comprise automatically causing the airborne mobile robot 442 to use its airborne pan-tilt-zoom camera 474 to acquire the PFD. In some instances, step 540 may comprise automatically causing another embodiment of the mobile robot 142 to use its one or more sensors 236 to acquire the PFD. In some instances, step 540 may also comprise automatically causing the land-borne mobile robot 342, the airborne mobile robot 442, or other embodiment of the mobile robot 142 to communicate the PFD to the one or more server devices 136. From step 540, the process 500 goes to (and continues at) step 544.

At step 544, the process 500 automatically uses the machine learning agent to predict, based on the PFD, the likelihood of whether the hypothetical action by the mobile robot against a found plant would be directed against a true *Toxicodendron* plant. In some instances, step 544 may comprise automatically causing the one or more server devices 136 to use the machine learning agent to make the prediction. From step 544, the process 500 goes to (and continues at) step 548.

At step 548, the process 500 automatically determines whether the predicted likelihood (determined at step 544) of whether the hypothetical action by the mobile robot would be directed against a true *Toxicodendron* plant is equal to or greater than the LAT (received at step 516). In some instances, step 548 may comprise automatically causing the one or more server devices 136 to make the determination. If the process 500 determines that the predicted likelihood is equal to or greater than the LAT, then the process 500 goes to (and continues at) step 576; otherwise, the process 500 goes to (and continues at) step 552.

At step 552, the process 500 automatically determines whether the predicted likelihood (determined at step 544) of whether the hypothetical action by the mobile robot would be directed against a true *Toxicodendron* plant is greater than the LCT (received at step 520). In some instances, step 552 may comprise automatically causing the one or more server devices 136 to make the determination. If the process 500 determines that the predicted likelihood is greater than the LCT, then the process 500 goes to (and continues at) step 556; otherwise, the process 500 goes to (and continues at) step 540.

At step 556, the process 500 automatically conducts one or more non-phytomorphological assessments ("NPA") of the found plant. The NPA may comprise one or more tests for and/or one or more other assessments of a presence, level, and/or amount (in, on, and/or around the found plant) of urushiol, one or more other oils, one or more other saps, one or more scents, and/or one or more other plant exudates, and/or may comprise one or more other tests for and/or one or more other assessments of one or more other distinguishing non-phytomorphological characteristics and/or features (of the found plant) that may be associated with one or more *Toxicodendron* varieties. At step 556, the process 500 also generates a corresponding non-phytomorphological confidence score ("NCS"). The NCS represents a probability or other confidence level that (based on the NPA) the found plant is a true *Toxicodendron* plant. In some instances, step 556 may comprise automatically causing the land-borne mobile robot 342, the airborne mobile robot 442, or another embodiment of the mobile robot 142 to conduct the NPA, may comprise automatically causing that embodiment of the mobile robot 142 to communicate data representing results of the NPA to the one or more server devices 136, and may comprise automatically causing the one or more server devices 136 to generate the NCS. In some embodiments, the one or more tests for and/or other assessments of urushiol may comprise spraying or otherwise applying a biological, chemical, and/or other reagent to one or more leaves and/or one or more other structures of the found plant to detect a presence of urushiol exudate on those one or more leaves and/or one or more other structures of the found plant. In some embodiments, the one or more tests for and/or other assessments of urushiol may also comprise using ultraviolet radiation to illuminate a product of a reaction of the reagent and the exudate. In some instances, such one or more tests for and/or other assessments of urushiol may comprise automatically causing the land-borne spray nozzle 392 of the land-borne mobile robot 342, the airborne spray nozzle 492 of the airborne mobile robot 442, or the spray system 248 of another embodiment of the mobile robot 142 to spray the reagent onto one or more leaves and/or one or more other structures of the found plant, and may comprise automatically causing the one or more sensors 236 of that embodiment of the mobile robot 142 to emit and/or detect ultraviolet radiation. From step 556, the process 500 goes to (and continues at) step 560.

At step 560, the process 500 automatically increments the ROC. In some instances, step 560 may comprise automatically causing the one or more server devices 136 to increment the ROC by 1. In some instances, step 560 may comprise automatically causing the one or more server devices 136 to increment the ROC by another suitable amount. From step 560, the process 500 goes to (and continues at) step 564.

At step 564, the process 500 automatically determines whether the NCS (generated at step 556) is greater than the CAT (received at step 524). In some instances, step 564 may comprise automatically causing the one or more server devices 136 to make the determination. If the process 500 determines that the NCS is greater than the CAT, then the process 500 goes to (and continues at) step 568; otherwise, the process 500 goes to (and continues at) step 572.

At step 568, the process 500 automatically adds the present PFD (acquired at step 540), along with additional annotations or other data indicating that the present PFD corresponds to a true *Toxicodendron* plant, to the previous PTD (received at step 508). In some instances, step 568 may comprise automatically causing the one or more server devices 136 to make the addition(s). From step 568, the process 500 goes to (and continues at) step 576.

At step 572, the process 500 automatically adds the present PFD (acquired at step 540), along with additional annotations or other data indicating that the present PFD corresponds to a non-*Toxicodendron* plant, to the previous PTD (received at step 508). In some instances, step 568 may comprise automatically causing the one or more server devices 136 to make the addition(s). From step 572, the process 500 goes to (and continues at) step 540.

At step 576, the process 500 automatically uses the mobile robot to attack the found plant. The attack may comprise spraying one or more herbicides onto the found plant, pulling or otherwise removing the found plant from its surrounding soil or other growing site, and/or any other suitable attack against the found plant. In some instances, step 576 may comprise automatically causing the one or more server devices 136 to communicate (through or over the network 112) a corresponding attack command to the mobile robot, and may comprise execution of the attack by the mobile robot. From step 576, the process 500 goes to (and continues at) step 580.

At step 580, the process 500 automatically uses the mobile robot to mark the site of the found plant. The site marking may comprise spraying one or more paints onto or next to the found plant, dropping a numbered ball at the site, planting a flag at the site, and/or any other suitable site marking actions. In some instances, step 580 may comprise automatically causing the one or more server devices 136 to communicate (through or over the network 112) a corresponding site mark command to the mobile robot, and may comprise execution of the site marking by the mobile robot. From step 580, the process 500 goes to (and continues at) step 584.

At step 584, the process 500 automatically uses the mobile robot to document the context of the site of the found plant. Documenting the context of the site of the found plant may comprise acquiring and recording still images and/or video of the found plant, of any marker(s) added to the site (at step 580), and/or of any one or more other aspect and/or feature of the site, and/or may include any one or more other suitable site documentation actions. In some instances, step 584 may comprise automatically causing the one or more server devices 136 to communicate (through or over the network 112) a corresponding site documentation command to the mobile robot, and may comprise execution of the site documenting by the mobile robot. In some instances, one of the one or more users 124 may use a corresponding one of the one or more user devices 118 to cause the one or more server devices 136 to communicate (through or over the network 112) such site documentation to the one or more user devices 118 for display and/or other presentation to the one or more users 124. In some instances, the one or more user devices 118 may be preconfigured to automatically communicate (through or over the network 112) such site documentation to the one or more user devices 118 for display and/or other presentation to the one or more users 124. From step 584, the process 500 goes to (and continues at) step 588.

At step 588, the process 500 automatically determines whether the ROC (received at step 512) is equal to or greater than the ROT (received at step 512). In some instances, step 588 may comprise automatically causing the one or more server devices 136 to make the determination. If the process 500 determines that the ROC is equal to or greater than the ROT, then the process 500 goes to (and continues at) step 532; otherwise, the process 500 goes to (and continues at) step 592. It should be appreciated that, as the process 500 will reach step 536 after going to step 532, determining that that the ROC is equal to or greater than the ROT will result in the process 500 automatically using the current PTD to retrain the machine learning agent.

At step 592, the process 500 automatically determines whether, according to the TSP, the search for *Toxicodendron* plants has been completed. In some instances, step 592 may comprise automatically causing the one or more server devices 136 to make the determination. If the process 500 determines that the search has been completed, then the process 500 winds up and ends; otherwise, the process 500 goes to (and continues at) step 540.

Figure 6:
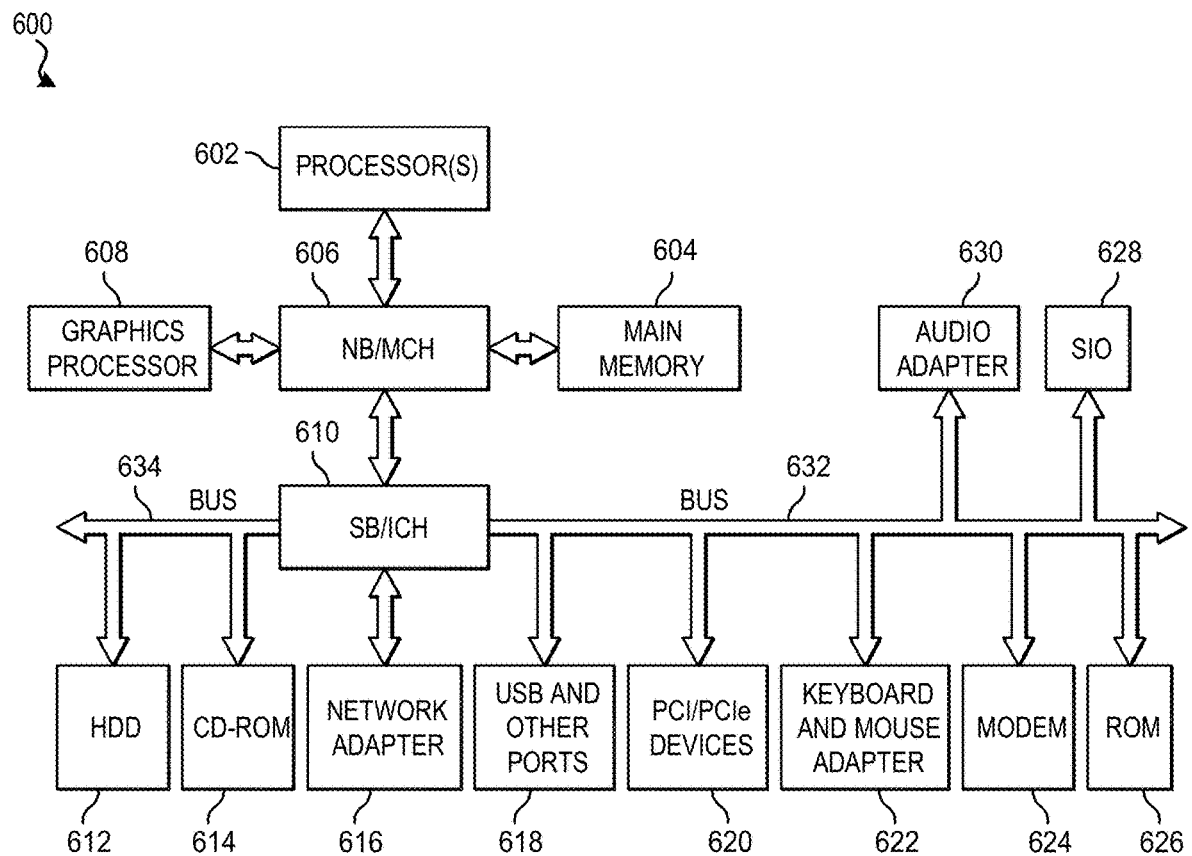
FIG. 6 is a block diagram illustration of a hardware architecture of a data processing system in accordance with aspects of the present disclosure.

FIG. 6 is a block diagram illustration of a hardware architecture of a data processing system 600 in accordance with aspects of the present disclosure. In some embodiments, one or more of the systems and/or components described herein (e.g., the network 112, the one or more user devices 118, the one or more remote data storage modules 130, the mobile robot 142, the one or more server devices 136, etc.) may be implemented using a corresponding one or more of the data processing system 600. Moreover, the data processing system 600 may be configured to store and execute one or more instructions of the process 500 and/or any other methods and/or processes described herein.

The data processing system 600 employs a hub architecture including north bridge and memory controller hub ("NB/MCH") 606 and south bridge and input/output ("I/O") controller hub ("SB/ICH") 610. Processor(s) 602, main memory 604, and graphics processor 608 are connected to NB/MCH 606. Graphics processor 608 may be connected to NB/MCH 606 through an accelerated graphics port ("AGP"). A computer bus, such as bus 632 or bus 634, may be implemented using any type of communication fabric or architecture that provides for a transfer of data between different components or devices attached to the fabric or architecture.

Network adapter 616 connects to SB/ICH 610. Audio adapter 630, keyboard and mouse adapter 622, modem 624, read-only memory ("ROM") 626, hard disk drive ("HDD") 612, compact disk read-only memory ("CD-ROM") drive 614, universal serial bus ("USB") ports and other communication ports 618, and peripheral component interconnect/peripheral component interconnect express ("PCI/PCIe") devices 620 connect to SB/ICH 610 through bus 632 and bus 634. PCI/PCIe devices may include, for example, Ethernet adapters, add-in cards, and personal computing ("PC") cards for notebook computers. PCI uses a card bus controller, while PCIe does not. ROM 626 may comprise, for example, a flash basic input/output system ("BIOS"). Modem 624 or network adapter 616 may be used to transmit and receive data over a network.

HDD 612 and CD-ROM drive 614 connect to SB/ICH 610 through bus 634. HDD 612 and CD-ROM drive 614 may use, for example, an integrated drive electronics ("IDE") or serial advanced technology attachment ("SATA") interface. In some embodiments, the HDD 612 may be replaced by other forms of data storage devices including, but not limited to, solid-state drives ("SSDs"). A super I/O ("SIO") device 628 may be connected to SB/ICH 610. SIO device 628 may comprise a chip on the motherboard that is configured to assist in performing less demanding controller functions for the SB/ICH 610 such as controlling a printer port, controlling a fan, and/or controlling the small light emitting diodes ("LEDS") of the data processing system 600.

The data processing system 600 may include a single processor 602 or may include a plurality of processors 602. Additionally, processor(s) 602 may have multiple cores. In some embodiments, data processing system 600 may employ a large number of processors 602 that include hundreds or thousands of processor cores. In some embodiments, the processors 602 may be configured to perform a set of coordinated computations in parallel.

An operating system is executed on the data processing system 600 using the processor(s) 602. The operating system coordinates and provides control of various components within the data processing system 600. Various applications and services may run in conjunction with the operating system. Instructions for the operating system, applications, and other data are located on storage devices, such as one or more of the HDD 612, and may be loaded into main memory 604 for execution by processor(s) 602. In some embodiments, additional instructions or data may be stored on one or more external devices. The processes described herein for the illustrative embodiments may be performed by processor(s) 602 using computer usable program code, which may be located in a memory such as, for example, main memory 604, ROM 626, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   acquiring phytomorphological field data (PFD) using a sensor component of a mobile robot;
   receiving a likelihood assumption threshold (LAT) related to conducting a non-phytomorphological assessment;
   receiving a likelihood confirmation threshold (LCT) related to conducting a non-phytomorphological assessment,
   receiving a confirmation assessment threshold (CAT) related to a non-phytomorphological assessment;
   generating, based on the PFD and using a machine learning agent, a PFD predicted likelihood of whether a hypothetical action by the mobile robot against a found plant would be directed against a true *Toxicodendron* plant;
   when the PFD predicted likelihood is less than or equal to the LAT threshold and the PFD predicted likelihood is greater than the LCT threshold;
      conducting a non-phytomorphological assessment of the found plant using the mobile robot,
      generating a non-phytomorphological confidence score (NCS) based on the non-phytomorphological assessment, and
      when the NCS is greater than the CAT, taking at least one actual action; and
   when the PFD predicted likelihood is greater than the LAT threshold, taking the at least one actual action,
   wherein the at least one actual action is selected from the group consisting of attacking the found plant, marking a site of the found plant, and documenting a context of the site, and
   wherein the action is taken using the mobile robot.

2. The method of claim 1, further comprising:
   training the machine learning agent using phytomorphological training data; and
   automatically initiating retraining of the machine learning agent based on the non-phytomorphological assessment,
   wherein the phytomorphological training data excludes the phytomorphological field data and the retraining of the machine learning agent comprises using the phytomorphological field data.

3. The method of claim 1, wherein the sensor component comprises a camera and the phytomorphological field data comprises image data.

4. The method of claim 3, wherein conducting the non-phytomorphological assessment of the found plant comprises detecting a plant exudate.

5. The method of claim 4, wherein detecting the plant exudate comprises applying a reagent to the plant exudate.

6. The method of claim 5, wherein detecting the plant exudate comprises detecting urushiol.

7. The method of claim 6, wherein detecting the plant exudate comprises:
   applying, using an emitter component of the mobile robot, ultraviolet radiation to a product of a reaction of the reagent with the plant exudate.

8. A system, comprising:
   a memory having instructions therein; and
   at least one processor in communication with the memory, wherein the at least one processor is configured to execute the instructions to:

acquire phytomorphological field data (PFD) via a sensor component of a mobile robot;
receive a likelihood assumption threshold (LAT) related to conducting a non-phytomorphological assessment;
receive a likelihood confirmation threshold (LCT) related to conducting a non-phytomorphological assessment:
receive a confirmation assessment threshold (CAT) related to a non-phytomorphological assessment;
generate, based on the PFD and via a machine learning agent, a PFD predicted likelihood of whether a hypothetical action by the mobile robot against a found plant would be directed against a true *Toxicodendron* plant;
when the PFD predicted likelihood is less than or equal to the LAT threshold and the PFD predicted likelihood is greater than the LCT threshold:
conduct a non-phytomorphological assessment of the found plant via the mobile robot,
generate a non-phytomorphological confidence score (NCS) based on the non-phytomorphological assessment, and
when the NCS is greater than the CAT, take at least one actual action; and
when the PFD predicted likelihood is greater than the LAT threshold, take the at least one actual action,
wherein the at least one actual action is selected from the group consisting of an attack on the found plant, a marking of a site of the found plant, and a documenting of a context of the site, and
wherein the action is taken via the mobile robot.

9. The system of claim 8, wherein the at least one processor is further configured to execute the instructions to:
train the machine learning agent with phytomorphological training data; and
automatically initiate a retraining of the machine learning agent based on the non-phytomorphological assessment,
wherein the phytomorphological training data excludes the phytomorphological field data and the retraining of the machine learning agent comprises use of the phytomorphological field data.

10. The system of claim 8, wherein the sensor component comprises a camera and the phytomorphological field data comprises image data.

11. The system of claim 10, wherein the at least one processor is further configured to execute the instructions to use the mobile robot to detect a plant exudate.

12. The system of claim 11, wherein the at least one processor is further configured to execute the instructions to use the mobile robot to apply a reagent to the plant exudate.

13. The system of claim 12, wherein the at least one processor is further configured to execute the instructions to use the mobile robot to detect urushiol.

14. The system of claim 13, wherein the at least one processor is further configured to execute the instructions to use the mobile robot to apply ultraviolet radiation to a product of a reaction of the reagent with the plant exudate.

15. A computer program product, the computer program product comprising a computer readable storage medium having program instructions embodied therewith, the program instructions executable by at least one processor to cause the at least one processor to:
acquire phytomorphological field data (PFD) via a sensor component of a mobile robot;
receive a likelihood assumption threshold (LAT) related to conducting a non-phytomorphological assessment;
receive a likelihood confirmation threshold (LCT) related to conducting a non-phytomorphological assessment;
receive confirmation assessment threshold (CAT) related to a non-phytomorphological assessment;
generate, via a machine learning agent and based on the PFD, a PFD predicted likelihood of whether a hypothetical action by the mobile robot against a found plant would be directed against a true *Toxicodendron* plant;
when the PFD predicted likelihood is less than or equal to the LAT threshold and the PFD predicted likelihood is greater than the LCT threshold;
use the mobile robot to conduct a non-phytomorphological assessment of the found plan, and
generate a non-phytomorphological confidence score (NCS) based on the non-phytomorphological assessment, and
when the NCS is greater than the CAT, take at least one actual action; and
when the PFD predicted likelihood is greater than the LAT threshold, take the at least one actual action,
wherein the at least one actual action is selected from the group consisting of an attack on the found plant, a marking of a site of the found plant, and a documenting of a context of the site, and
wherein the at least one actual action is taken via the mobile robot.

16. The computer program product of claim 15, wherein the program instructions are further executable by the at least one processor to cause the at least one processor to:
train the machine learning agent with phytomorphological training data; and
automatically initiate a retraining of the machine learning agent based on the non-phytomorphological assessment,
wherein the phytomorphological training data excludes the phytomorphological field data and the retraining of the machine learning agent comprises use of the phytomorphological field data.

17. The computer program product of claim 15, wherein the sensor component comprises a camera and the phytomorphological field data comprises image data.

18. The computer program product of claim 17, wherein the program instructions are further executable by the at least one processor to cause the at least one processor to use the mobile robot to detect a plant exudate.

19. The computer program product of claim 18, wherein the program instructions are further executable by the at least one processor to cause the at least one processor to use the mobile robot to apply a reagent to the plant exudate.

20. The computer program product of claim 19, wherein the program instructions are further executable by the at least one processor to cause the at least one processor to use the mobile robot to detect urushiol.

* * * * *